June 13, 1933.  R. P. F. LIDDELL  1,913,402
FILTERING SYSTEM
Filed July 11, 1930  2 Sheets-Sheet 1
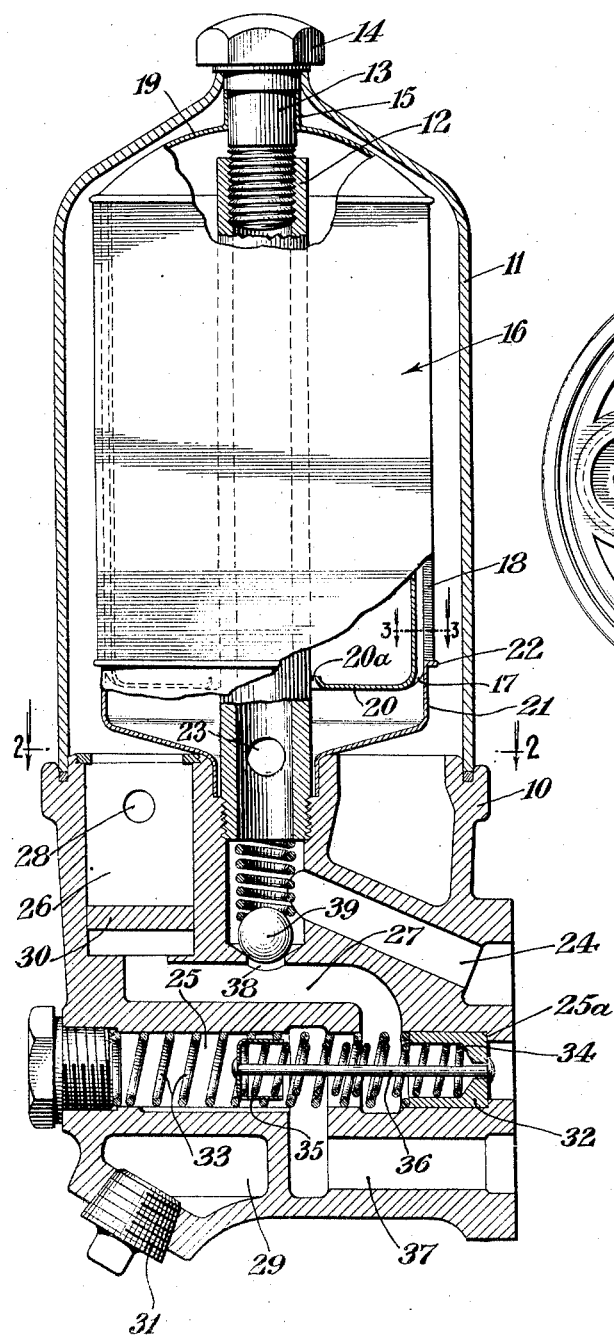
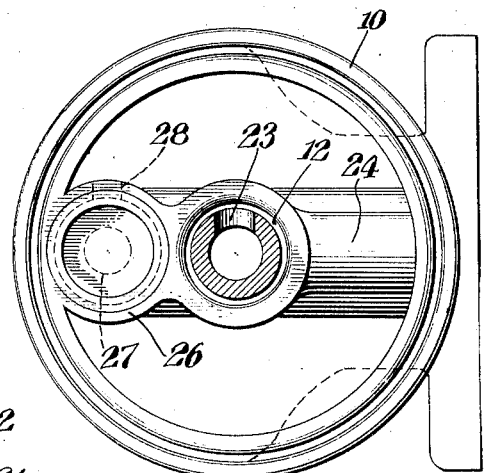
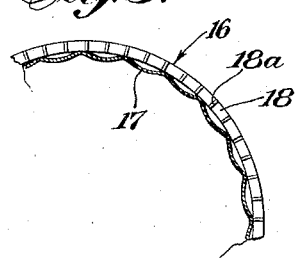
INVENTOR
Robert P. F. Liddell
BY
Kenyon & Kenyon
ATTORNEYS

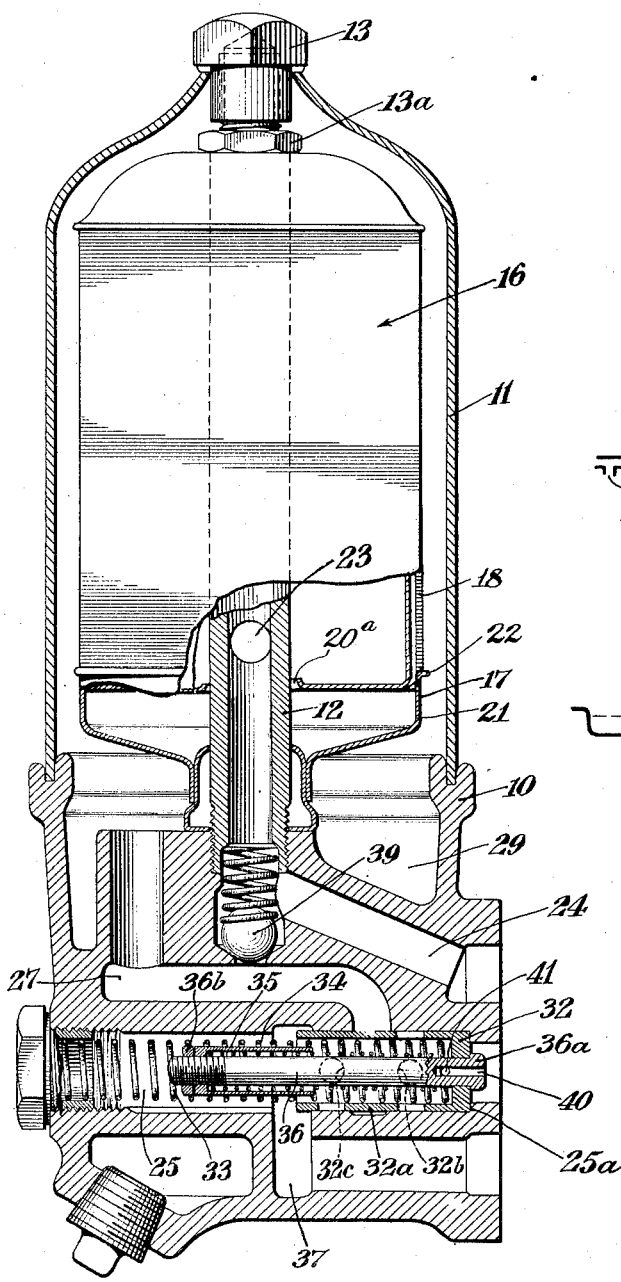
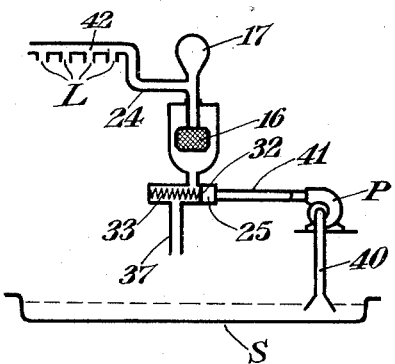

Patented June 13, 1933

1,913,402

UNITED STATES PATENT OFFICE

ROBERT P. F. LIDDELL, OF MORRIS TOWNSHIP, MORRIS COUNTY, NEW JERSEY, ASSIGNOR TO MOTOR IMPROVEMENTS, INC., OF NEWARK, NEW JERSEY, A CORPORATION OF DELAWARE

FILTERING SYSTEM

Application filed July 11, 1930. Serial No. 467,213.

This invention relates to improvements in filtering systems for removing or recovering solid substances suspended in fluids.

An object of this invention is a filtering system having provision for directing filtered fluid reversely through the filtering unit for the purpose of removing from the same the solid material filtered from the fluid and collected by the filtering unit.

In a filter system embodying this invention, in addition to means for causing fluid containing undesirable solid substances to flow through the filter unit, means are provided for utilizing the filtered fluid to build up a supply of potential energy and are so constructed and arranged as to permit the utilization of the potential energy thus built up to force filtered fluid reversely through the filter unit upon cessation of the flow of contaminated fluid through said unit. The reverse flow of filtered fluid through the filtering unit depends upon the temporary reduction of the pressure applied to the contaminated fluid below that to which the filtered fluid is subjected.

The filter system may be of a type in which the fluid is circulated through an apparatus which depends upon a continuous supply of the fluid for proper operation and which continuously adds to the fluid contaminating matter which is removed substantially as fast as it is produced by repeatedly passing the fluid through the filtering unit; or the system may be of a type in which the fluid is passed but once through the filtering unit. Preferably the arrangement is such that reverse flow of filtered fluid through the filtering unit will occur whenever the flow producing means ceases to function after a period of operation. The solid material filtered from the fluid and collected by the unit is removed from the unit by the reverse flow of filtered fluid through the unit.

The filtering unit disclosed in detail in the copending application of Robert P. F. Liddell, Serial No. 368,381, filed June 4, 1929, may be used to good advantage in the above described system. Such a filtering unit comprises a cylinder composed of a helix of thin metal ribbon wound with its faces normal to the axis of the helix and provided with means for spacing the turns of the helix to provide filtering interstices. This filter has a relatively small area and frequent cleaning is desirable to insure efficient operation. The filtrate accumulating on such a filtering unit is located entirely on the outer surface and may be easily removed by reverse flow. In the present system, provision is made for quickly establishing a pressure differential between the outlet and inlet sides of the filter unit so that a quick "kick" is given to the filtrate, thereby dislodging the same. Reversely flowing liquid escapes through a vent in the inlet section and the extent of the reverse flow is limited so that the filtrate removed from the unit is not carried out of the filter casing, but is retained therein and is collected in a settling chamber.

In an automotive engine lubricating system, cleaning of the filter unit by the reverse flow insures that the filter unit is always clean at the starting of the engine when the oil is stiffest and does not become coated with filtrate until after the oil has become free flowing.

This invention is applicable to the filtration of any fluid contaminated with solid substances. The invention may be embodied in the lubricating system of an internal combustion engine, in the supply system for an oil burner, or in any other system wherein frequent cleaning of the filter unit is desirable.

Other objects, novel features and advantages of this invention will be apparent from the following description and accompanying drawings, wherein:

Fig. 1 is a vertical section through a filter embodying the invention.

Fig. 2 is a section on the line 2—2 of Fig. 1 with the cover and filter unit removed.

Fig. 3 is an enlarged fragmentary section on the line 3—3 of Fig. 1;

Fig. 4 is a diagrammatic illustration of a system embodying the invention, and

Fig. 5 is a vertical section of a modification.

Referring now to Fig. 1, there is disclosed a filter in which the casing comprises a base 10 and a cover 11. The cover 11 is of uniform thickness and the major portion thereof is cylindrical while its upper end is contracted along an ogee curve and terminates in an aperture of considerably less diameter than that of the main portion of the cover. The lower end of the cover 11 fits in a groove provided in the base 10, the groove being of substantially the same width as the thickness of the cover wall and a gasket being arranged in the bottom thereof. A pipe or hollow stud 12 is threaded to the base 10 and extends substantially the full length of the cover 11. The boss 13 of a clamping member 14 extends through the aperture in the cover 11 and has a threaded connection with the end of the stud 12. The clamping member 14 serves to hold together the base 10 and the cover 11.

A filter unit 16 is arranged within the casing and is supported by the pipe 12. This filter unit may and preferably does comprise a cylinder formed of a helically wound metal ribbon 18, the turns of which are slightly spaced by transverse ribs 18a extending from one face. Such a filter unit is disclosed in detail and claimed in the said co-pending application. The filter unit or cylinder surrounds and is supported by a fluted drum 17 which is provided with a top wall 19 having a neck 15 fitting the boss 13 and a bottom wall 20 having an aperture 20a through which the post 12 passes, the aperture being of larger diameter than the post to provide a passage into the drum 17. A cup 21 receives the lower end of the drum 17 and is provided with a flange 22 which engages the bottom of the filtering unit. The cup 21 has a neck which fits the post 12. The flutes of the drum provide passages through which filtered oil is conducted into the cup 21. The post 12 is provided with a port 23 and communicates at its lower end with an outlet channel 24 in the base 10.

In the base there is provided an inlet channel comprising a cylindrical valve chamber 25, a second cylindrical valve chamber 26 opening into the cover 11 and a connecting conduit 27. Near the upper end of the valve chamber 26 there is provided a port 28 leading into a settling chamber 29 formed in the base 10. A piston or valve 30 is slidably received in the valve chamber 26 and the settling chamber 29 is provided with a drainage port normally closed by a plug 31. In the valve chamber 25 is provided a piston or valve 32 and a spring 33 tending to force the piston into contact with the shoulder 25a. The piston is formed with a recess into which projects an end of a spring 34, the other end of which is seated in a cup 35. A rod 36 extends through the cup, spring and piston and is provided with heads for limiting the expansion of the spring, the piston being slidable on the rod. A vent conduit 37 leads from the valve chamber 25. The arrangement of the conduits 27 and 37 is such that when the piston 32 engages the shoulder 25a there is free communication between them, but when the piston moves to the left it first closes the conduit 27, then opens this conduit and closes the conduit 37 and if moved still further to the left opens conduit 37. A by-pass port 38 leads from the inlet conduit 27 into the outlet channel 24 and a relief valve 39 controls flow from the inlet channel to the outlet channel through the by-pass.

Fig. 4 shows the above filter connected in a circulating system such as the lubricating system of an internal combustion engine. P is a pump having its inlet pipe 40 extending into the oil sump S of the engine. The discharge pipe 41 of the pump leads to the passage 25. A conduit 42 leads from the outlet channel 24 to the leads L for the bearings of the engine. The conduit 37 discharges into the sump S.

A filter unit of the type above disclosed has a relatively small filtering surface and becomes coated with filter cake after a period of use, thereby reducing its efficiency. Frequent removal of the filter is desirable. The system above described effects removal of the filter cake whenever the engine, with which it is associated, is stopped. It is unusual, in normal operation for an automobile engine to run continuously for periods of more than several hours. As a result, the filter is cleaned often enough to insure efficient operation thereof. The filter unit is always clean at the time when it is most desirable that it be clean, namely, at the starting of the engine when the oil is stiff.

In the operation of this system, dirty oil from the sump is delivered to the passage 25 and presses back the piston 32 to open the conduit 27 whereupon the dirty oil flows into the passage 30 and lifts the piston until it clears the port 28. The dirty oil then flows through the port 28 into the settling chamber 29 and around the filter unit. It then passes through the slots in the unit into the flutes of the drum 17 through which it flows into the cup 22. From the cup, it is led through the port 23, outlet channel 24 and conduit 42 to the bearing leads L. The bearings offer resistance to the flow of the oil and cause the filtered oil to rise in the drum and compress the air trapped in the drum, thereby building up a supply of potential energy to be used to effect reverse flow of filtered oil through the unit to dislodge the filter cake. The pump P is preferably of the positive displacement type and is of such capacity that when the engine is idling the pressure in the system is sufficient to operate the piston 32 to open the conduit 27.

The filter cake is removed by the reverse flow of a small amount of filtered oil under approximately the pressure required to operate the piston 32. This action is effected by relieving the pressure on the inlet side of the filter immediately upon the stopping of the engine. When the engine stops, the pump also stops and the piston 32 is returned into engagement with the shoulder 25ª by the spring 33. The conduit 27 is thus put into communication with the vent conduit 37 which is open to the sump. When the piston closes off the conduit 27, the pressure on the oil in the system and the pressure of the air in the drum equals the oil in the conduit 27 begins to flow reversely into the vent conduit 37, thereby relieving the pressure exerted on the under face of the piston 30 and permitting the same to descend to the bottom of the chamber 26, thus increasing the capacity of the casing and permitting the compressed air within the dome 17 to force filtered fluid reversely through the filter unit. The amount of oil which flows reversely through the unit is limited by the operation of the piston 30 and equals approximately the capacity of the chamber 26. Thus only a small volume of unfiltered oil is returned to the sump. As soon as the conduits 27 and 37 are in communication, the pressure on the inlet side of the filter unit drops and oil is forced reversely through the filter unit under the pressure exerted by the compressed air in the dome 17. The pressure in the inlet side of the filter unit is relieved before there is any appreciable drop in pressure on the outlet side of the filter due to leakage through the bearing leads. As a result, the pressure applied to the oil to effect reverse flow is substantially the pressure required to operate the piston 32.

By permitting the reverse flow of only a small volume of oil, the filter cake is prevented from being carried into the sump S. Instead, it is retained in the settling chamber 29. Before oil carrying the removed filter cake can reach the port 28, the piston 30 will have shut off the flow. During the interval before another reverse flow, the cake will have settled to the bottom of the chamber 29. The settlings may be removed through the drain port.

The by-pass between the inlet and outlet channels insures flow of oil to the bearings in the event that the filter unit is clogged or the oil is too stiff, as at starting the engine, to flow through the filter unit in proper quantity to lubricate the bearings. The piston 32 also serves to prevent excessive pressure in the system. Under operating pressure, the piston 32 merely moves to the left sufficiently to put the conduit 27 in communication with the passage 25. In this position, the cup 35 engages the rear wall of the passage and the spring 34, which is considerably stiffer than the spring 33, prevents further movement of the piston. However, if excessive pressure tends to develop in the system, the spring 34 yields to permit the piston 32 to uncover the conduit 37. The piston 32 therefore acts also as a safety valve.

In the modification disclosed in Fig. 5, 10 is the base and 11 is the cover. A hollow stud 12 is threaded to the base 10 and a clamping member 13 is threaded on the upper end of the stud. A nut 13a clamps in position the filter unit 16 through which the stud 12 extends. The structure of the filter unit and the supporting drum is essentially the same as that shown in Fig. 1.

In the base 10 there is provided an outlet channel 24 communicating with the lower end of the stud 12 in which is provided a port 23 communicating with the interior of the drum 17 above the level of the lower ends of the channels formed by the flutes of the drum and the filter unit. Also in the base there is provided an inlet channel comprising a cylindrical valve chamber 25 from which a conduit 27 leads to the space between the cover 11 and unit 16. In the valve chamber 25 there is slidably mounted a piston 32, having a cylindrical skirt 32a. A spring 33 is provided for urging the piston 32 toward the shoulder 25a which limits movement of the piston. One end of a spring 34 projects into the piston 32 and the other end is seated in a cup 35. A rod 36 extends through the cup, spring and piston and is provided with a head 36a at one end and a nut 36b at the other end, the rod being slidable relative to the piston. A vent conduit 37 leads from the valve chamber 25 and the skirt 32a of the piston 32 is provided with spaced apertures 32b and 32c. The arrangement of the conduits 27 and 37 and the ports 32b and 32c is such that when the piston 32 engages the shoulder 25a, the inlet to the conduit 27 is closed and when the piston moves to the left communication between the conduits 27 and 37 is established through the ports 32b and 32c. Further movement of the piston closes off the conduit 27 from the conduit 37 and after the piston 32 has been moved sufficiently communication is established from the valve chamber 25 into the conduit 27. When the valve is in this position oil will flow into the filter casing. On the return movement of the valve the conduit 27 will be temporarily put in communication with the vent conduit 37. In the right hand end of the rod 36 there is provided a longitudinal bore 40 having a transverse port 41. Relative movement of the piston 32 and the rod 36 is effective to close the port 40.

The filter above described is adapted to be used in the same manner as the filter described in Fig. 1 and is connected in the lubricating system of an internal combustion engine in the same manner as disclosed in Fig. 4. The operation of this filter is quite similar to the operation of the filter disclosed in Fig. 1. Dirty oil from the pump is delivered to the passage 25 and presses back the piston 32 to open the conduit 27 whereupon the dirty oil flows through the passage 27 into the interior of the filter. A slight amount of oil flows through the bore 40, port 41 and passes back by way of the vent conduit 37 to the sump. The amount of oil thus by-passed is so small that it does not affect the operation of the piston 32 and as long as the pump is operating the piston 32 will be held sufficiently far to the left to uncover the vent conduit 37.

When the piston 32 is in its extreme left position the port 41 is closed, this being due to the fact that upon engagement of the left end of the rod 36 with the rear wall of the chamber 25, the rod is held against movement while the piston is moved still further until the combined force of springs 33 and 34 equals the oil pressure. When the pump is stopped and oil ceases to flow into the filter, the spring 33 forces the piston to the right, thereby uncovering the port 41. This provides a by-pass for oil into the valve chamber 25, thus permitting the piston to be moved easily and quickly to the right until it engages the shoulder 25a. Upon registration of the ports 32b and 32c with the conduits 27 and 37, the reverse flow of oil previously referred to is established. The flow is only momentary due to the continued movement of the piston to the right. The amount of oil which flows reversely through the unit is therefore limited. With this modification and with the modification disclosed in Fig. 1, the filter cake is prevented from being carried into the pump P and is collected in the settling chamber 29 as previously described.

In both modifications, the amount of reverse flow is so limited as to prevent the passage of any of the removed filter cake to the sump. This filter cake is deposited in the settling chamber at the bottom of the filter during periods of rest of the system. The pressure applied by the reversely flowing oil to the filter cake is substantially the same as the pressure existing in the system during normal operation thereof, for such pressure is retained within the drum 17 until communication is established between the conduits 27 and 37 at which time the pressure in the space between the filter unit and the casing drops practically to zero. The filter cake is thus given a quick high pressure "kick" which effectively clears the surface of the filter unit, thus insuring efficient operation of the unit.

It is, of course, to be understood that various modifications may be made in the structure above described, without in any way departing from the spirit of the invention as defined in the appended claims.

I claim:

1. In a filtering system, a filter unit dividing the system into inlet and outlet sections, pressure storing means communicating with the outlet section, a loaded check valve in said inlet section tending to oppose flow toward said unit, a vent for said inlet section, said check valve being movable by liquid flowing toward the filter unit into position to close said vent, and means for limiting reverse flow of liquid in said inlet section through said vent upon closure of said valve.

2. In a filtering system, a filter unit dividing the system into inlet and outlet sections, pressure storing means communicating with the outlet section, a loaded check valve in said inlet section tending to oppose flow toward said unit, a vent for said inlet section, said check valve being movable by liquid flowing toward the filter unit into position to close said vent, and a slow-acting check valve for limiting reverse flow of liquid in said inlet section through said vent upon closure of said valve.

3. In a filtering system, a filter unit dividing the system into inlet and outlet sections, pressure storing means communicating with said outlet section, a check valve in said inlet section, a vent for said inlet section, said check valve being movable by liquid flowing toward the unit into position to close said vent, resilient means tending to oppose such movement of the check valve, and means for limiting reverse flow of liquid in said inlet section through said vent upon closure of said check valve.

4. In a filtering system, a filter unit dividing the system into inlet and outlet sections, pressure storing means communicating with said outlet section, a check valve in said inlet section, a vent for said inlet section, said check valve being movable by liquid flowing toward the unit into position to close said vent, resilient means tending to oppose such movement of the check valve, and a slow-acting check valve to limit reverse flow of liquid in said inlet section through said vent upon closure of said check valve.

5. In a filtering system, a filter unit dividing said system into inlet and outlet sections, pressure storing means communicating with the outlet section, a check valve in said inlet section tending to oppose flow toward said unit, a vent for said inlet section, said valve being movable by the liquid flowing toward the unit into position to close said vent, resilient means for restoring said check valve upon cessation of flow toward said unit, and a slow-acting check valve in the inlet section to limit reverse flow of liquid in said section from said unit through said vent.

6. A filter comprising a casing, a filter unit within said casing, an outlet conduit leading from the interior of said filtering unit, pressure storing means communicating with said outlet conduit, an inlet conduit, said inlet conduit terminating in a chamber communicating with said casing, a check valve in said inlet conduit tending to oppose flow toward said chamber, a vent for said inlet conduit, said valve being movable by liquid flowing toward said chamber to close said vent, a piston slidably arranged in said chamber, and a port leading from said chamber into said casing.

7. A filter comprising a casing, a filtering unit within said casing, an outlet conduit leading from the interior of said filtering unit, pressure storing means communicating with said outlet conduit, a cylindrical chamber, said chamber having an inlet at one end and having an outlet and a vent axially spaced from each other, a conduit leading from said outlet to said casing, a slow-acting check valve in said conduit, a piston slidable in said chamber, said piston being adapted in one position to obstruct the inlet with the outlet and vent in communication and in the second position to close said vent with said inlet and outlet in communication, and resilient means tending to oppose movement of the piston from the first to the second position.

8. A filter comprising a casing, a filtering unit within said casing, an outlet conduit leading from the interior of said filtering unit, pressure storing means communicating with said outlet conduit, a cylindrical chamber, said chamber having an inlet at one end and having an outlet and a vent axially spaced from each other, a conduit leading from said outlet to said casing, a piston slidable in said chamber, said piston being adapted in one position to obstruct said inlet with said outlet and vent in communication, in a second position to close said vent with said inlet and outlet in communication, and in a third position to open said vent with said inlet and outlet in communication, resilient means for opposing movement of said piston from said first to said second position, and additional resilient means opposing movement of said piston from said second to said third position.

9. A filter comprising a casing, a filtering unit within said casing, an outlet conduit leading from the interior of said filtering unit, pressure storing means communicating with said outlet conduit, a cylindrical chamber, said chamber having an inlet at one end and having an outlet and a vent axially spaced from each other, a conduit leading from said outlet to said casing, a slow-acting check valve in said conduit, a piston slidable in said chamber, said piston being adapted in one position to obstruct said inlet with said outlet and vent in communication, in a second position to close said vent with said inlet and outlet in communication, and in a third position to open said vent with said inlet and outlet in communication, resilient means for opposing movement of said piston from said first to said second position, and additional resilient means opposing movement of said piston from said second to said third position.

10. A filter comprising a casing, a filtering unit within said casing, an outlet conduit leading from the interior of said filtering unit, pressure storing means communicating with said outlet conduit, a chamber in said head, said chamber having an inlet, an outlet, and a vent, a piston slidably mounted in said chamber and being movable by liquid flowing toward said unit to close said vent, a conduit leading from said outlet to the interior of said casing, a valve chamber in said conduit, a reciprocating piston in said chamber, and a port leading from said chamber into said casing.

11. A filter comprising a casing, a filter unit within said casing, an outlet conduit leading from the interior of said filter unit, pressure storing means communicating with said outlet conduit, an inlet conduit, a check valve in said inlet conduit, a vent for said inlet conduit, said check valve being movable by liquid flowing toward said casing to close said vent, means tending to oppose such movement of the check valve, and means for limiting reverse flow of liquid in said inlet conduit through said vent.

12. A filter comprising a casing, a filter unit within said casing, an outlet conduit leading from the interior of said filter unit, pressure storing means communicating with said outlet conduit, an inlet conduit, a check valve in said inlet conduit, a vent for said inlet conduit, said check valve being movable by liquid flowing toward said casing to close said vent, means tending to oppose such movement of the check valve, and a slow-acting check valve in said inlet conduit for limiting reverse flow therein through said vent.

13. A filter comprising, a casing, a filter unit within said casing, an outlet conduit leading from the interior of said filter unit, pressure storing means communicating with said outlet conduit, a cylindrical chamber, said chamber having an inlet at one end and having an outlet and a vent axially spaced from each other, a piston slidable in said chamber, said piston being adapted in one position to obstruct said inlet with said outlet and vent in communication, in a second position to close said vent with said inlet and outlet in communication and in a third position to open said vent with said inlet and outlet in communication, resilient means for opposing movement of said piston from said first to said second position, additional resilient means opposing movement of said piston from said second to said third position, a conduit leading from the outlet from said valve chamber to a second valve chamber communicating with the interior of said casing, a piston slidable in said second chamber, and a port leading from said chamber into said casing.

14. A filter comprising, a casing, a filter unit within said casing, an outlet conduit leading from the interior of said filter unit, pressure storing means communicating with said outlet conduit, a cylindrical chamber, said chamber having an inlet at one end and having an outlet and a vent axially spaced from each other, a piston slidable in said chamber, said piston being adapted in one position to obstruct said inlet with said outlet and vent in communication, in a second position to close said vent with said inlet and outlet in communication, resilient means for opposing movement of said piston from said first to said second position, a conduit leading from the outlet from said valve chamber to a second valve chamber communicating with the interior of said casing, a piston slidable in said second chamber, and a port leading from said chamber into said casing.

15. A filter comprising a casing, a filter unit within said casing, an outlet conduit leading from the interior of said filter unit, pressure storing means communicating with said conduit, a cylindrical chamber, said chamber having an inlet port at one end and having an outlet port and a vent axially spaced from each other, a conduit leading from said outlet port into said casing and a hollow piston slidably contained in said chamber, said piston having axially spaced ports adapted simultaneously to register with said outlet port and vent to effect reverse flow through said chamber.

16. In a filter, a cylindrical chamber, said chamber having an inlet port at one end and having an outlet port and a vent axially spaced from each other, a conduit leading from said outlet port to said casing, a piston slidable in said chamber, said piston adapted in one position to obstruct said inlet port and close said outlet port, in a second position to obstruct said inlet port with said outlet port and vent in communication and in a third position to close said vent with said inlet and outlet ports in communication, and resilient means for opposing movement of said piston from said first to said third position.

17. In a filter, a cylindrical valve chamber having an inlet port at one end and having a lateral outlet port and a lateral vent port axially spaced from each other, a piston slidable in said chamber, said piston being adapted in one position to obstruct said inlet port and close said outlet port and in a second position to close said vent port with said inlet and outlet ports in communication, resilient means for opposing movement of said piston from said first to said second position, said piston having provision for establishing communication between said outlet port and vent port when intermediate said first and said second positions.

18. In a filtering system, a valve chamber, said valve chamber having an inlet port, an outlet port and a vent port, a valve member movably mounted in said chamber, said valve member being adapted in one position to obstruct said inlet port and close said outlet port and in another position to close said vent port with said inlet and outlet ports in communication, and resilient means tending to oppose movement of the valve member from the first to the second position, said valve member having provision for establishing communication between said outlet port and vent port when intermediate said first and second positions.

19. In a filter, a valve chamber, said valve chamber having an inlet port, an outlet port and a vent port, a valve member movably mounted in said chamber, said valve member being adapted in one position to obstruct said inlet port and close said outlet port and in another position to close said vent port with said inlet and outlet ports in communication, and resilient means tending to oppose movement of the valve member from the first to the second position, said valve member having provision for establishing communication between said outlet port and vent port when intermediate said first and second positions.

20. In a filter, a valve chamber, said valve chamber having an inlet port at one end and having axially spaced lateral outlet and vent ports, a piston valve slidable in said chamber and adapted in one position to close said inlet port, resilient means opposing movement of said piston from said position, and a skirt for said piston, said skirt being provided with apertures for establishing communication between said outlet and vent ports in another position of said piston.

21. In a device of the character described, a cylindrical valve chamber, a conduit, said chamber having an inlet port at one end and having an outlet port and a vent axially spaced from each other and a hollow piston slidable in said chamber, said piston having axially spaced ports adapted simultaneously to register with said outlet port and vent.

22. In a device of the character described, a valve chamber having an inlet and an outlet and a vent, a spring pressed piston in said chamber tending to oppose flow into said chamber and being movable by liquid flowing into the chamber to close said vent, a conduit leading from said outlet, and means in said conduit for limiting reverse flow through the same with said outlet port and vent in communication.

23. In a device of the character described, a valve chamber having inlet, outlet and vent ports, a spring pressed piston tending to oppose flow through said inlet port into said chamber and being movable by liquid flowing into the chamber into position to close said vent and open said outlet port, a conduit leading from said outlet port, and means for limiting reverse flow of liquid in said conduit through said vent when the outlet and vent are in communication.

24. In a filter, an air trap comprising a fluted drum having its side wall imperforate, a filtering unit surrounding said drum and forming channels therewith, means connecting the lower ends of said channels with the lower portion of the interior of said drum, and an outlet leading from the drum above the level of the lower ends of said channels.

25. In a filter, a cylindrical filtering unit comprising a helix formed of thin metal ribbon with its faces normal to the axis of the helix and means for spacing the turns to form filtering interstices, an air trap comprising a tubular support having a closed top and an annular series of spaced edges extending axially thereof, said helix surrounding said support and forming channels therewith, a reservoir at the lower end of said support communicating with said channels, a passageway connecting said reservoir with the lower portion of said support, and an outlet for filtered fluid.

26. In a filter, a cylindrical filtering unit comprising a helix formed of thin metal ribbon with its faces normal to the axis of the helix and means for spacing the turns to form filtering interstices, an air trap comprising a tubular support having a closed top and an annular series of spaced edges extending axially thereof, said helix surrounding said support and forming channels therewith, a reservoir at the lower end of said support communicating with said channels, a passageway connecting said reservoir with the lower portion of said support, and an outlet from said drum above the level of the lower ends of said channels.

27. In a filter, an air trap comprising a hollow cylinder having a closed top, a filtering unit surrounding said cylinder, said cylinder having an annular series of spaced edges extending axially thereof and engaging said filtering unit to form channels therewith, a reservoir below said cylinder communicating with the interior thereof and into which said channels discharge, and an outlet from said reservoir.

28. In a filter, an air trap comprising a hollow cylinder having a closed top, a filtering unit surrounding said cylinder, said cylinder having an annular series of spaced edges extending axially thereof and engaging said filtering unit to form channels therewith, a cap fitting over the lower end of said cylinder to form a reservoir communicating with the interior thereof and into which said channels discharge, and an outlet for the filtered fluid.

29. In a filter, an air trap comprising a hollow cylinder having a closed top, an apertured bottom therefor, a filtering unit surrounding said cylinder, said cylinder having an annular series of spaced edges extending axially thereof and engaging said filtering unit to form channels therewith, a cap fitting over the lower end of said cylinder and forming a reservoir into which said channels discharge, and an outlet for filtered fluid.

30. In a filter, a cylindrical filtering unit comprising a helix formed of thin metal ribbon with its faces normal to the axis of the helix, and means for spacing the turns to form filtering interstices, an air trap comprising a cylinder having a closed top, an apertured bottom for said cylinder, said cylinder being arranged within said helix and having an annular series of spaced edges engaging said helix and forming channels therewith, a cap fitting over the lower end of said cylinder and forming a reservoir communicating with the lower ends of said channels, and an outlet for filtered fluid.

31. In a filter, an air trap comprising a cylindrical support having a closed top, a filtering unit surrounding said support, said support having an annular series of spaced edges extending axially thereof and engaging said filtering unit to form channels therewith, a reservoir below said cylinder into which said channels discharge, a passageway between said reservoir and the interior of said support, and an outlet leading from the interior of said support above the lower ends of said channels.

In testimony whereof, I have signed my name to this specification.

ROBERT P. F. LIDDELL.

CERTIFICATE OF CORRECTION.

Patent No. 1,913,402.  June 13, 1933.

ROBERT P. F. LIDDELL.

It is hereby certified that error appears in the printed specification of the above numbered patent requiring correction as follows: Page 3, line 11, after "the" third occurrence, insert "pressure required to operate piston. As soon as the conduits 27 and 37 are in communication, the"; same page, line 25, beginning with the words "As soon" strike out all to and including "dome 17." in line 30; and that the said Letters Patent should be read with these corrections therein that the same may conform to the record of the case in the Patent Office.

Signed and sealed this 8th day of August, A. D. 1933.

(Seal)  Acting Commissioner of Patents.